June 8, 1926.
W. H. MORGAN
ELECTRIC MACHINE BRAKE
Filed Oct. 6, 1922
1,588,129
2 Sheets-Sheet 1
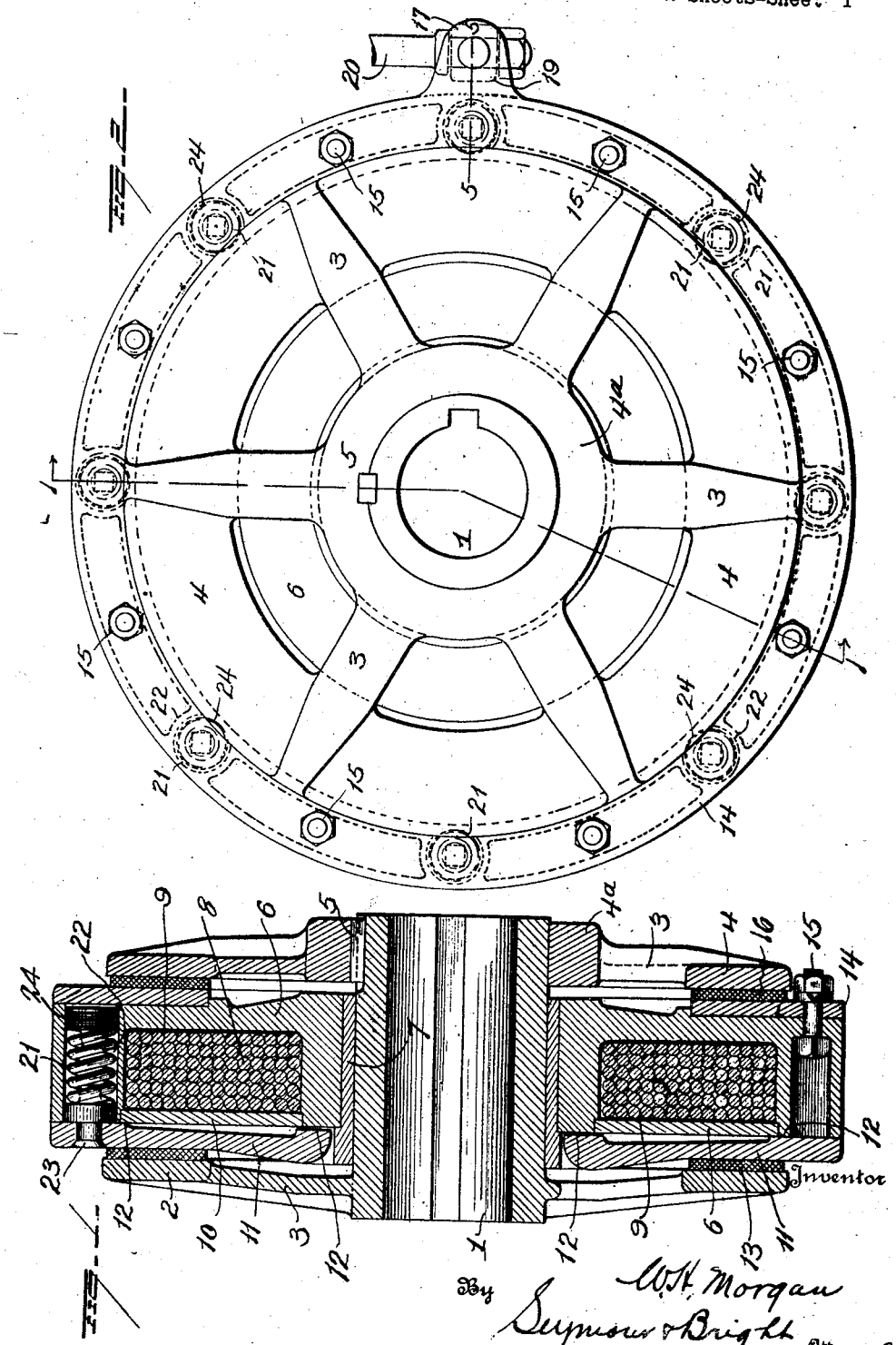

June 8, 1926.
W. H. MORGAN
1,588,129
ELECTRIC MACHINE BRAKE
Filed Oct. 6, 1922
2 Sheets-Sheet 2
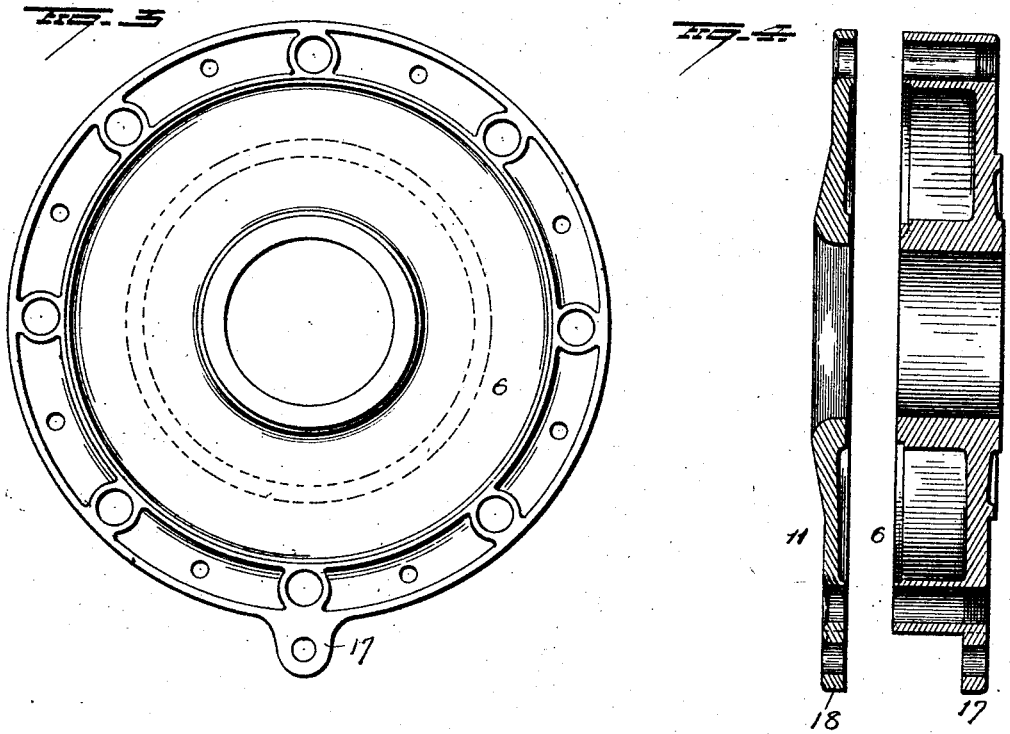
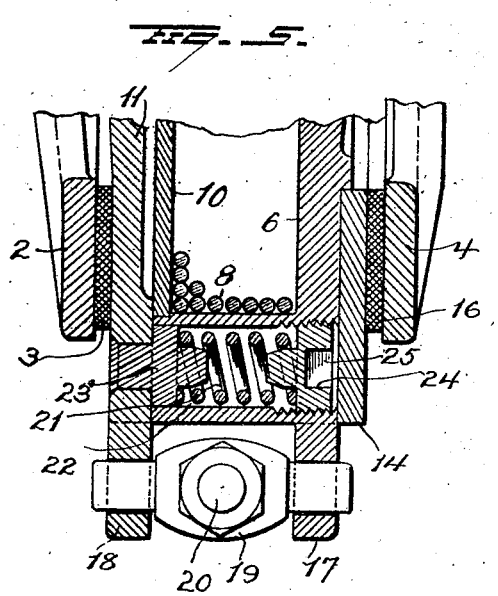
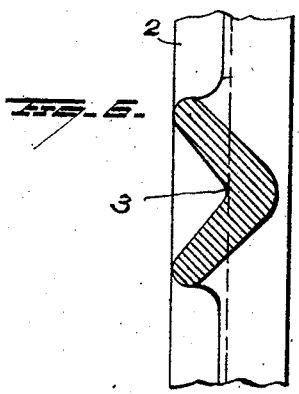

Patented June 8, 1926.

1,588,129

UNITED STATES PATENT OFFICE.

WILLIAM HENRY MORGAN, OF ALLIANCE, OHIO.

ELECTRIC MACHINE BRAKE.

Application filed October 6, 1922. Serial No. 592,728.

This invention relates to improvements in electric machine brakes and more particularly to such as are spring-applied and magnetically released,—one object of the invention being to provide a simple self-contained brake structure to be supported upon the shaft, the rotation of which it controls; which shall require no holding-down bolts or shoes on the frame of the machine; which will operate to control the rotation of the shaft regardless of the direction of rotation of the latter, and in which the brake linings may be readily renewed without necessity for dismembering the whole structure.

A further object is to provide a simple electric brake structure in which both revolvable and non-revolvable parts may be applied to and supported by the standard short armature shaft of an electric motor, whereby any wear in the bearing supporting the shaft will not throw the parts of the brake out of alignment or adjustment with regard to each other.

A further object is to so construct a brake structure of the type mentioned that its operation will be equally effective whether the shaft be rotated in one direction or the other.

With these and other objects in view, the invention consists in certain novel features of construction and combinations of parts as hereinafter set forth and pointed out in the claims.

In the accompanying drawings; Figure 1 is a sectional view on the line 1—1 of Figure 2 showing an embodiment of my invention; Figure 2 is a rear face view; Figure 3 is a rear face view of the magnet frame; Figure 4 is a sectional view, showing the magnet frame and the armature; Figure 5 is a fragmentary sectional view on the line 5—5 of Figure 2, and Figure 6 is a fragmentary sectional view of a portion of one of the brake shoe wheels.

My improved brake structure is particularly well adapted for attachment to the hoist motors of electric cranes and hoists, and said structure includes a hub 1 to be keyed or otherwise secured to the armature shaft of an electric motor. The hub 1 carries a circular brake shoe 2, the latter being connected with the hub 1, through the medium of a circular series of spokes 3, preferably made V-shaped in cross section as indicated in Figure 6. The shoe is thus made in the form of a spoked wheel having an elongated hub and these parts made in a single integral structure,—the said shoe being located at one end of the hub. A similar annular spoked shoe 4 provided with a hub 4ª is located on and keyed to the other end of the hub 1, as indicated at 5.

An electro-magnet frame 6 encircles the hub 1 (which carries the brake shoes 2—4), and has pressed therein, a bushing 7 in which said hub rotates, said magnet frame being capable of limited endwise movement relatively to said hub. The magnet coil 8, which latter may be of round insulated wire or it may be of insulated copper ribbon,— said coil being enclosed in a suitable envelope 9 of insulating material and retained in position within the magnet frame by a nonmagnetic plate or closure 10. An annular armature frame 11 for the magnet encircles the hub 1 and is formed with faces 12—12 disposed opposite the pole faces of the magnet, and to said armature a brake lining 13 is secured, said brake lining being positioned for cooperation with the brake shoe 2. A steel plate or ring 14 is secured to the magnet frame 6 by bolts 15 and carries a brake lining 16 for cooperation with the brake shoe 4. The brake linings 13 and 16 may be made of material having a high coefficient of friction, such as wood, rubber, cork, fiber or similar material, and may be made in sections if desired.

The magnet frame 6 and armature are provided with depending perforated ears 17, 18 in which a yoke 19 is pivotally mounted, and this yoke is connected, by anchor rod 20 or other means with some stationary part of a crane or other apparatus, to prevent the magnet frame and its armature from turning.

Compression springs 21 are disposed between the magnet frame 6 and the armature 11 and serve normally to press the brake linings against the brake shoes 2 and 4 carried by the motor armature shaft, in a manner to apply braking action to the latter. In the embodiment of the invention shown in the drawing, eight compression springs are employed, (although a greater or less number may be used) and they are housed in tubular portions 22 near the peripheral portion of the magnet frame 6. These springs bear at one end against centering plugs 23 carried by the armature frame 11 and at their other ends against plug 24 threaded in the portions 22,—said last-mentioned plugs being made with a wrench-engaging part 25, whereby they may be adjusted to adjust the tension of the springs 21.

When the magnet coil 8 is energized, the pull of the magnet will overcome the action of the series of compression springs 21 and draw the magnet frame 6 and the armature frame toward each other, thereby withdrawing the non-revoluble friction brake lining rings 13, 16 from pressure against the annular brake shoes 2 and 4 and permitting free rotation of the shaft. Opening of the circuit of the magnet coil will deenergize the magnet and permit the compression springs 28 to operate to apply the brake.

While I have described my improvements as applied to the armature shaft of an electric motor, they may if desired, be employed with a through shaft driven by gearing or otherwise from the revolving element of a motor.

My improved brake is so constructed that it can be applied to the standard short motor armature shaft extension. Both the revolving and non-revolving parts of the brake structure being supported by the shaft, any wear in the bearing supporting the shaft will not throw the parts of the brake out of alignment or adjustment with regard to each other and does not require any holding-down bolts or shoes on the frame of the machine. The brake structure is self-contained; may be easily applied to a crane, hoist or other apparatus and, with the exception of the anchor rod or similar fastening means, the forces are all taken up within the brake structure and not transmitted to any other part of the machinery. Furthermore, the improved brake will operate equally well with either direction of rotation of the shaft 1. This is important in case of a crane hoist as the brake will not only hold the load from lowering but will prevent the drifting of the hook block in the hoist direction.

Various changes might be made in the details of construction of my invention without departing from the spirit of the latter and I do not wish to restrict myself to the precise details herein set forth.

Having fully described my invention what I claim as new and desire to secure by Letters-Patent, is:—

1. In an electric brake of the character described, the combination with a hub, of annular brake shoes rigid with respective ends of said hub, a magnet frame and an armature frame supported by said hub between said brake shoes, a brake lining carried by the armature frame and cooperable with one of said brake shoes, a brake lining carried by the magnet frame and cooperable with the other brake shoe, compression springs between the magnet and armature frames, and anchor means connected with said magnet and armature frames to prevent rotation of the same.

2. In an electric brake of the character described, the combination with a hub, and spaced brake shoes on said hub and rotatable therewith, of a magnet frame and an armature frame supported by said hub between the brake shoes thereon, brake linings carried respectively by the magnet and armature frames and cooperable with the brake shoes respectively, compression springs between the magnet and armature frames, and anchor means for preventing rotation of said magnet and armature frames.

In testimony whereof, I have signed this specification.

WILLIAM HENRY MORGAN.